US008631724B2

(12) United States Patent
Miyata

(10) Patent No.: US 8,631,724 B2
(45) Date of Patent: Jan. 21, 2014

(54) FASTENING SOCKETS, WASHERS AND FASTENERS USED WITH THE WASHERS AND THE FASTENING SOCKETS

(75) Inventor: Katsuji Miyata, Kobe (JP)

(73) Assignee: Unytite Corporation, Kobe-shi (JP)

( * ) Notice: Subject to any disclaimer, the term of this patent is extended or adjusted under 35 U.S.C. 154(b) by 266 days.

(21) Appl. No.: 13/282,365

(22) Filed: Oct. 26, 2011

(65) Prior Publication Data

US 2012/0125163 A1 May 24, 2012

(30) Foreign Application Priority Data

Nov. 22, 2010 (JP) ................................ 2010-260465
Apr. 25, 2011 (JP) ................................ 2011-096931

(51) Int. Cl.
*B25B 13/48* (2006.01)
*B25B 23/08* (2006.01)
*F16B 39/24* (2006.01)
*F16B 43/00* (2006.01)
*B25B 21/00* (2006.01)

(52) U.S. Cl.
USPC ............... 81/124.5; 81/55; 411/161; 411/544

(58) Field of Classification Search
USPC .......... 81/124.4, 124.5, 55, 13; 411/160, 161, 411/371.2, 372, 544
See application file for complete search history.

(56) References Cited

U.S. PATENT DOCUMENTS

| | | | | |
|---|---|---|---|---|
| 7,192,232 | B2 * | 3/2007 | Esser | 411/161 |
| 7,246,542 | B2 * | 7/2007 | Karol | 81/121.1 |
| 7,261,506 | B2 * | 8/2007 | Smolarek | 411/161 |
| 7,735,397 | B2 * | 6/2010 | Junkers | 81/55 |
| 7,857,566 | B2 * | 12/2010 | Sullivan et al. | 411/155 |
| 7,950,309 | B2 * | 5/2011 | Junkers et al. | 81/55 |
| 8,033,000 | B2 * | 10/2011 | Hohmann et al. | 29/407.01 |
| 2004/0131445 | A1 * | 7/2004 | Kjellberg | 411/368 |

FOREIGN PATENT DOCUMENTS

| | | |
|---|---|---|
| JP | 50-18852 | 2/1975 |
| JP | 909618 | 10/1994 |
| JP | 2008-110414 A | 5/2008 |

* cited by examiner

*Primary Examiner* — David B Thomas
(74) *Attorney, Agent, or Firm* — Marshall, Gerstein & Borun LLP

(57) ABSTRACT

A fastening socket B includes an inner socket portion including engaging means for engaging a nut or the like, and an outer socket portion for engaging a washer A with an outer edge portion 2, which includes a tapered surface and engaging teeth. The tapered surface is gradually inclined outwardly and toward a bottom surface of the outer edge portion. The inner socket portion 21 and the outer socket portion 22 are coupled together with a mechanism so as to be rotated in opposite directions. The outer socket portion is provided with engaging claws for engaging the engaging teeth, and a tapered bottom end surface of each of the claws 24 is gradually inclined radially inwardly and toward a base end side. A surface of a bolt head that is brought into contact with a surface of objects is provided with frictional coefficient increasing treatment.

8 Claims, 9 Drawing Sheets

FASTENING SOCKETS, WASHERS AND FASTENERS USED WITH THE WASHERS AND THE FASTENING SOCKETS

BACKGROUND OF THE INVENTION

1. Field of the Invention

The present invention relates to a "fastening socket", which is a tool for tightening a bolt or a nut of a fastener, etc. used to fasten members in steel structures, machine frames, etc., to a "washer for receiving counter torque" used for fastening, and to a preferred "fastener" for fastening using the fastening socket and the washer for receiving counter torque.

2. Description of the Related Art

In steel structures such as bridges, etc., a plurality of members is fastened with bolts and nuts. In recent years, "torque wrenches", which can control rotary torque such that tensile stress acting on a bolt is at a predetermined value after the fastening is completed, are used for such fastening.

An electrical powered torque wrench which is one of the torque wrenches is used (see Japanese Laid-Open Patent Application Publication No. 2008-110414). The electrical powered torque wrench (hereinafter, called an "electrical tool") has a socket with a hexagonal hole, which is to be set on a nut or a bolt head. The socket is attached to a rotary shaft of the electrical tool. The electrical tool is provided with a rod member that is attached to a non-rotating part and serves to receive counter torque generated due to rotation of the nut (or the bolt). During tightening, the rod member attached to the electrical tool may be engaged with a member of a structure located near a fastening site, thereby preventing counter-torque from acting on an operator who is holding the electrical tool. The term "electrical tool" is used in the present specification and the claims for the sake of convenience and is not limited to electrically powered tools, and also refers to pneumatically powered tools and hydraulically powered tools.

If there is no such a member with which the rod member can be engaged, the operator has to hold the rod member to receive the counter-torque.

To solve this problem, there is provided a washer for receiving counter torque, which is to be located adjacent to a nut or a bolt for receiving such counter torque up to a predetermined torque during tightening, and a coaxial double socket for the washer (see Japanese Laid-Open Patent Application Publication No. SHO 50-18852). The present applicant filed an application for design registration for a washer having a shape similar in plan view to the above washer; the application was already registered (Japanese Registered Design No. 909618).

The coaxial double socket has an inner socket portion for engaging a nut (or a bolt head) that is disposed inside an outer socket portion for engaging a washer. The nut (or the bolt head) is non-circular such as hexagonal as seen in plan view, and the washer is also non-circular. Accordingly, before starting of tightening, positioning of the socket with respect to both of the nut (or the bolt head) and the washer in a rotational direction is required. Furthermore, since the inner socket portion and the outer socket portion are coupled with a gear mechanism, their positions are not free and dependent from each other. Furthermore, setting of their positions must be performed inside the socket, where an operator is not able to see. For these reasons, the positioning of them is very difficult to perform, particularly in a bad foothold or in a narrow space. As a result, workability is remarkably worsened. Furthermore, if the electrical tool is operated while the inner socket portion is engaged with the nut (or the bolt head) without positioning of the outer socket portion with respect to the washer, the washer or the outer socket portion may be damaged.

In the meanwhile, when a nut or a bolt head is rotated for fastening using the electrical tool, the nut may be relatively and simultaneously "rotated with" the bolt. In this case, it is necessary to fix the bolt head (or the nut), which is otherwise "rotated simultaneously", using a spanner or the like. When a nut is threaded onto a bolt that is already penetrated through a dividing wall, for example, while one worker is turning the nut located on a front surface side of the wall using a torque wrench, another worker needs to fix a bolt head located on a rear surface side of the wall.

In such a case, a pair of two workers is always required. And, because of these two workers are not able to see each other, they must work together, checking each other's progresses on the bolt and the nut. The work under such a condition is extremely inefficient.

SUMMARY OF THE INVENTION

The present invention addresses the above described problems, and one object of the present invention is to provide a fastening socket and a washer for receiving counter torque that allows easy tightening of a nut (or a bolt head) to be tightened through only positioning of the nut. Another object of the present invention is to provide a fastener by which a nut can be tightened onto a bolt without "simultaneous bolt-nut rotation" using the fastening socket and the washer for receiving counter torque.

According to one aspect of the present invention, there is provided a fastening socket, comprising:

- an inner socket portion including engaging means (a hexagonal hole, a hexagonal bar, etc.) for engaging a nut or a bolt head; and
- an outer socket portion for engaging a washer with an outer edge portion which includes a tapered surface and engaging teeth, the tapered surface being gradually inclined outwardly and toward a bottom surface of the outer edge portion,
- wherein the inner socket portion is disposed inside the outer socket portion, the inner socket portion and the outer socket portion are coupled together with a mechanism that allows the inner socket portion and the outer socket portion to be cooperatively and relatively rotated in opposite directions (the case where one is fixed and the other one is rotated can also be included), and
- wherein the outer socket portion is provided with engaging claws for engaging the engaging teeth of the washer, and each of the engaging claws is provided with a tapered tip end surface, which is gradually inclined radially inwardly and toward a base end side of the outer socket portion.

According to another aspect of the present invention, there is provided a washer for receiving counter torque generated due to rotation of a nut or a bolt head which is mounted on a bolt shaft of the bolt and adjacent the nut or the bolt head, comprising:

- a hole at a center as seen in plan view, through which a bolt shaft portion is passed; and
- an outer edge portion extending outwardly relative to outer edges of the nut and the bolt head, and providing engaging teeth around the washer,
- wherein the washer is used when the nut or bolt is tightened with a fastening socket, which includes an inner socket portion with engaging means for engaging the nut or the bolt head and an outer socket portion for engaging the engaging teeth of the washer, the inner socket portion and the outer socket portion are coupled together with a mechanism that allows the inner socket portion and the outer socket portion to be cooperatively and relatively rotated in opposite directions, and wherein the outer edge portion of the washer provides a tapered surface at a socket side that is gradually inclined outwardly and toward a bottom surface of the outer edge portion.

It should be noted that in this specification and the claim, examples of the "engaging means" include a variety of forms of non-circular holes, such as rectangular holes, hex lobe wrench holes, etc., and a variety of forms of bars, such as rectangular bars, bars having a hex lobe cross-section, in addition to the hexagonal hole and the hexagonal bar, etc.

According to the fastening socket and the washer for receiving counter torque of the present invention constructed above, if a rotary tool (including a manually powered rotary tool in addition to the electrical tool) is operated (rotated) under conditions that the nut is temporarily tightened onto the bolt with the washer between the bolt head and the nut, that the inner socket portion of the socket is set on the nut (or the bolt head) located on the washer, and that the socket is pressed toward the washer, the tapered surfaces of the engaging claws of the socket about the tapered surface of the washer, due to the rotation, the engaging claws slide over the tapered surface of the washer in a rotational direction, and the engaging claws smoothly fall down between the adjacent engaging teeth. As a result, the socket may move toward the washer by a distance corresponding to the thickness of the washer, and the outer socket portion is securely engaged with the outer periphery of the washer in a desired manner. And, thereafter, when the socket is further rotated, the washer receives counter torque generated due to the rotation of the rotary tool.

Therefore, when the nut is tightened onto the bolt, an operator only has to set the inner socket portion on the nut (or the bolt head) tightened temporarily onto the bolt and thereafter the operator rotates the socket so as to rotate the outer socket portion relative to the inner socket portion; then, the outer socket portion is automatically engaged with the washer in a desired manner. For this reason, even if working space is narrow or even located at a high elevation, the socket can be easily positioned on a nut (or the bolt head) and a washer.

In the washer for receiving counter torque, the engaging teeth includes an outer periphery, which may be shaped such that concave portions extending inwardly and convex portions extending outwardly are alternately and repeatedly provided in a radial direction around an imaginary reference circle that is centered at a central point of the washer as seen in plan view. Stress concentration acting on the washer due to rotation of the inner socket portion becomes difficult to occur.

In the washer for receiving counter torque, the convex portion may include a tapered surface formed such that a rear portion of the convex portion in a tightening rotational direction has a thickness greater than a front portion of the convex portion. The engaging claws of the outer socket portion can far more easily slide into the concave portions of the washer. For this reason, the outer socket portion of the socket can be more smoothly set (positioning in a tightening rotational direction) on the washer.

In the washer for receiving counter torque, a bottom surface of the washer (a surface of the washer away from the socket) may be formed to be an arched surface, and the arched surface is gradually projected in a direction away from the socket (toward the objects) starting from a center of the washer to outward. This enables the bottom surface of the washer to contact a surface of the objects with a high frictional coefficient. As a result, even if temporary tightening is somewhat inadequate, this washer can be used as a member for receiving counter torque so that a nut can be easily tightened onto the bolt. Additionally, the configuration of this washer can easily be obtained through press working on a washer. In this configuration, when fastening is completed, the arch-shape of the washer is flattened. Therefore, the completion of fastening can be confirmed based on such information.

According to another one aspect of the present invention, there is provided a fastener for fastening objects, comprising: a bolt with a bolt head and a bolt shaft; and a nut to be tightened onto the bolt;

wherein when the objects are to be fastened using the bolt and the nut, the washer (according to the previous invention: claim 2) is disposed between the objects and one of the bolt and the nut, the one being to be rotated, and the fastening socket (according to the previous invention: claim 1) is used for tightening; and wherein an anti-rotation washer is disposed between the objects and one of the bolt and the nut, the one being not to be rotated, the anti-rotation washer provides a surface that is brought into contact with at least a surface of the objects and is provided with frictional coefficient increasing treatment.

According to another one aspect of the present invention, there is provided a fastener for fastening objects comprises:

a bolt with a bolt head and bolt shaft; and a nut to be tightened onto the bolt;

wherein when the objects are to be fastened using the bolt and the nut, the washer (according to claim 2) is disposed between the objects and the nut to be rotated, and the fastening socket (according to claim 1) is used for tightening; and wherein a surface of the bolt head that is brought into contact with a surface of the objects is provided with frictional coefficient increasing treatment.

Each of the above fasteners can inhibit "simultaneous rotation" of one of the nut and the bolt, the one being not to be rotated.

In the fasteners, the frictional coefficient increasing treatment may include forming concavities and convexities on the surface of the anti-rotation washer to increase friction, such concavities and convexities can effectively be formed on the surface of the anti-rotation washer using a shot peening process.

In the fasteners, the frictional coefficient increasing treatment may be embodied by arching a surface that is brought into contact with a surface of objects such that the arched surface at a center is spaced apart from the surface of the objects, and such that the arched surface is gradually inclined outwardly and toward the surface of the objects, the frictional coefficient increasing treatment can advantageously be provided, while forming, such as shape-forming, is performed by forging.

According to the fastening socket and the washer for receiving counter torque of the present invention, even if fastening is performed at a place where working space is limited or at a high elevation, or even if there is no member for receiving counter torque, a nut can be tightened onto a bolt, without having to position the washer in a rotational direction, by only setting the socket on the nut (or the bolt head) and then rotating the socket using an rotary tool such as the electrical tool or the like.

The fastener according to the present invention can effectively inhibit simultaneous and relative rotation of the bolt with respect to the nut.

DETAILED DESCRIPTION OF THE PREFERRED EMBODIMENTS

Hereinafter, embodiments of the present invention will be described with reference to Embodiment 1

Figure 1:
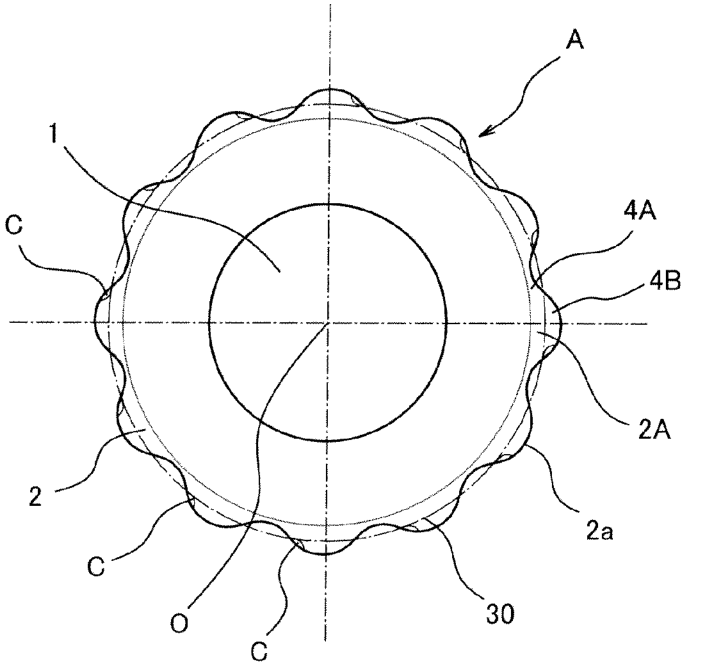
FIG. 1 is a plan view showing a configuration of a washer according to an embodiment of the present invention.

In FIG. 1, reference symbol A denotes a washer for receiving counter torque. As shown in FIG. 1, the washer A provides a through-hole 1 in a center portion thereof as seen in plan view, and a bolt shaft 15*s* (see FIG. 8) is inserted through the through-hole 1. The washer A provides an outer edge portion 2 which extends outwardly beyond an outer edge 10*a* of a nut 10 (or a bolt head 15*h*). Furthermore, as shown in FIG. 1, an outer periphery (outer edge) 2*a* of the washer A is shaped such that concave portions 4A extending inwardly and convex portions 4B extending outwardly are alternately and repeatedly provided in a radial direction around an imaginary reference circle 30 that is centered at a central point O of the washer A, as seen in plan view. The outer edge portion 2 provides engaging teeth around the washer. In this embodiment, the engaging teeth are formed on the entire outer edge portion 2. However, the engaging teeth according to the present invention are not limited to the above configuration, and instead may be any configuration, independent of or dependent on the outer edge portion 2, that can receive rotational torque generated due to rotation of a nut (or a bolt). For example, the engaging teeth may have a star-shape independent of the outer edge portion 2, another shape having repeated concave and convex portions in a rotational direction, or a non-circular shape with respect to a rotational axis of a nut (or a bolt).

In this embodiment, as shown in FIG. 1, in plan view, the outer edge portion 2 of the washer A is formed by a region from the inner ends of the concave portions 4A to the outer ends of the convex portions 4B. In other words, the outer edge portion 2 is formed by a portion of the washer A outside a circle line passing through the inner most points of the concave portions 4A. However, the outer edge portion 2 may be formed by a region of the washer A from the points located on an inner side of the inner ends of the concave portion 4A to the outer ends of the convex portions 4B.

Figure 2:
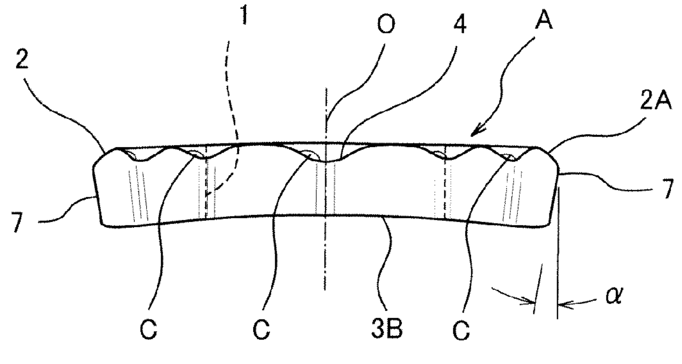
FIG. 2 is a side view showing the washer of FIG. 1.
Figure 3:
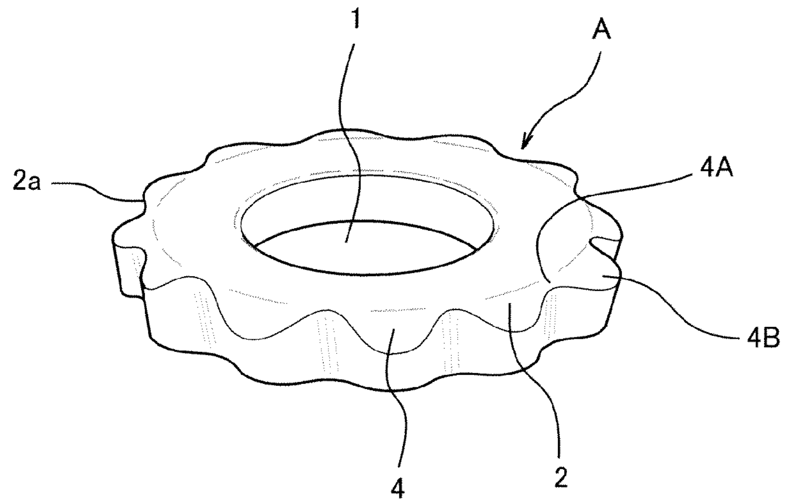
FIG. 3 is a perspective view showing a configuration of a top surface and a side surface of the washer of FIGS. 1 and 2, as viewed from obliquely above.
Figure 4:
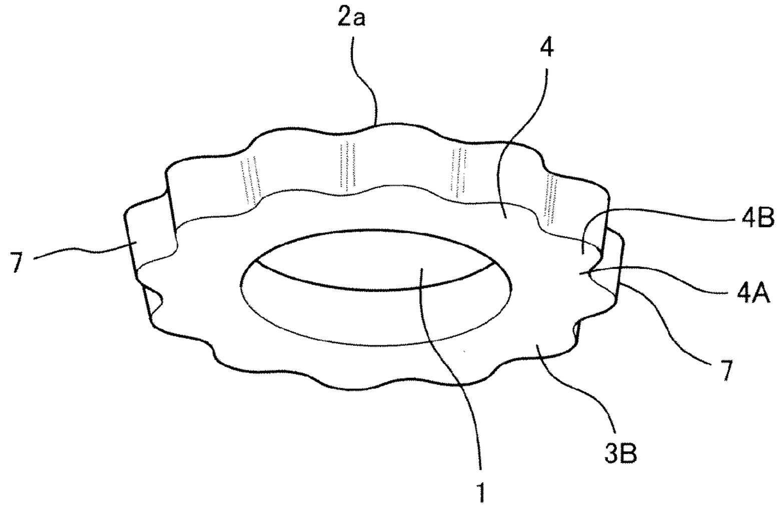
FIG. 4 is a perspective view showing a configuration of a bottom surface and a side surface of the washer of FIGS. 1 and 2, as viewed from obliquely below.

The outer edge portion 2 includes a tapered surface 2A that is gradually inclined outwardly and toward a bottom surface 3B of the outer edge portion 2. In other words, the outer edge portion 2 gradually becomes thinner radially outwardly (in this embodiment, as shown in FIG. 2, the tapered surface 2A is substantially curved (substantially quadratic curve) as seen in side view). However, the tapered surface may be formed by a straight inclined surface.

As shown in FIG. 2, the bottom surface 3B of the washer A according to the embodiment is arched such that the arched surface gradually projects, starting from a center of the washer A toward outward, in a direction away from a socket (downwardly in FIG. 2), i.e., both sides of the bottom surface 3B with respect to a center line O, as seen in side view, are gradually curved downwardly.

Furthermore, as shown in FIG. 2, a side surface 7 of the washer A according to the embodiment is formed by an inclined surface having an angle of inclination of $\alpha$, an upper end of the side surface 7 being more projected outwardly relative to a lower end of the side surface 7. Such a configuration of the washer A can be easily formed by manufacturing the washer A with a press machine, using characteristics of the press working or selecting the shape of a die for the press working.

Figure 9:
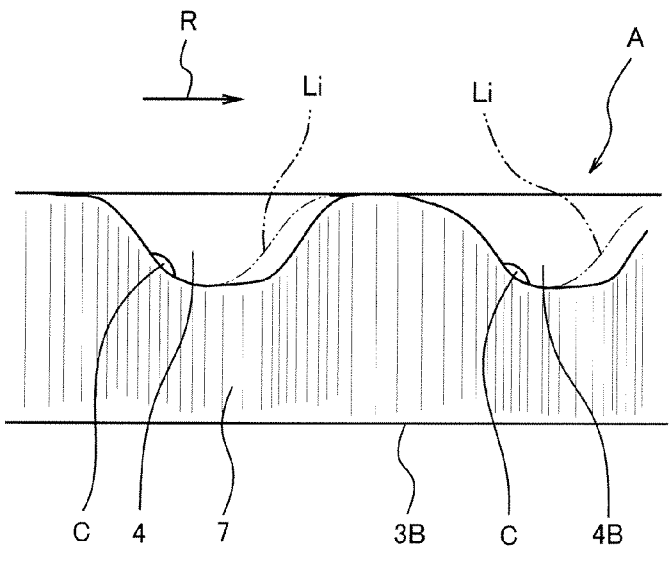
FIG. 9 is a partial enlarged view showing a portion of an outer periphery of the washer illustrated in FIGS. 1-4.
Figure 10:
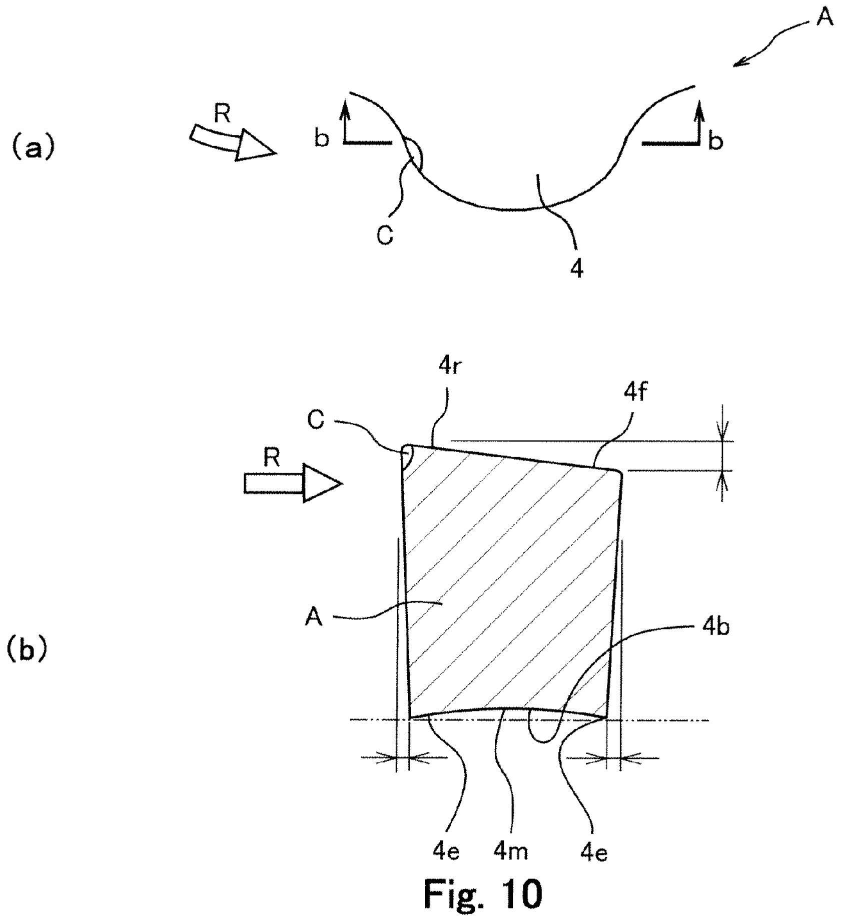
FIG. 10 is an enlarged view showing a portion of a periphery of the washer illustrated in FIGS. 1-4, where (a) is an enlarged plan view showing an outer edge portion, and (b) is a cross-sectional view, taken along the line b-b of (a)

Furthermore, as shown in FIG. 10(*b*) or FIG. 9, the convex portion 4B is a tapered surface that is formed such that a rear portion 4*r* of the convex portion 4B in a tightening rotational direction R of an outer socket portion 22 described later is thicker than a front portion 4*f* of the convex portion 4B in the tightening rotational direction R. Dashed-two dotted lines in FIG. 9 represent lines in the case where no tapered surfaces are shown. Although the tightening rotational direction of the outer socket portion 22 is assigned R, R means the tightening rotational direction of the outer socket portion 22 with respect to an inner socket portion 21. Furthermore, as shown in FIG. 10(*b*), a bottom surface 4*b* of the convex portion 4B of the washer A has outer side (lateral in the drawing) corners 4*e* projecting like an edge in a direction away from the socket (downward in the drawing) relative to a center portion 4*m* of the bottom surface 4*b*. This configuration is a preferred configuration because it, during fastening, increases the friction forces (maximum static frictional force and dynamic frictional force) by the corners (edges) between the bottom surface of the washer A and the objects to be fastened together, thereby reducing the slippage between them. In this embodiment, the corners 4*e* of the bottom surface 4*b* of the convex portion 4B project substantially like an edge to increase its frictional coefficient according to the present invention. Each configuration described above can be easily formed by manufacturing the washer A using press working.

Figure 8:
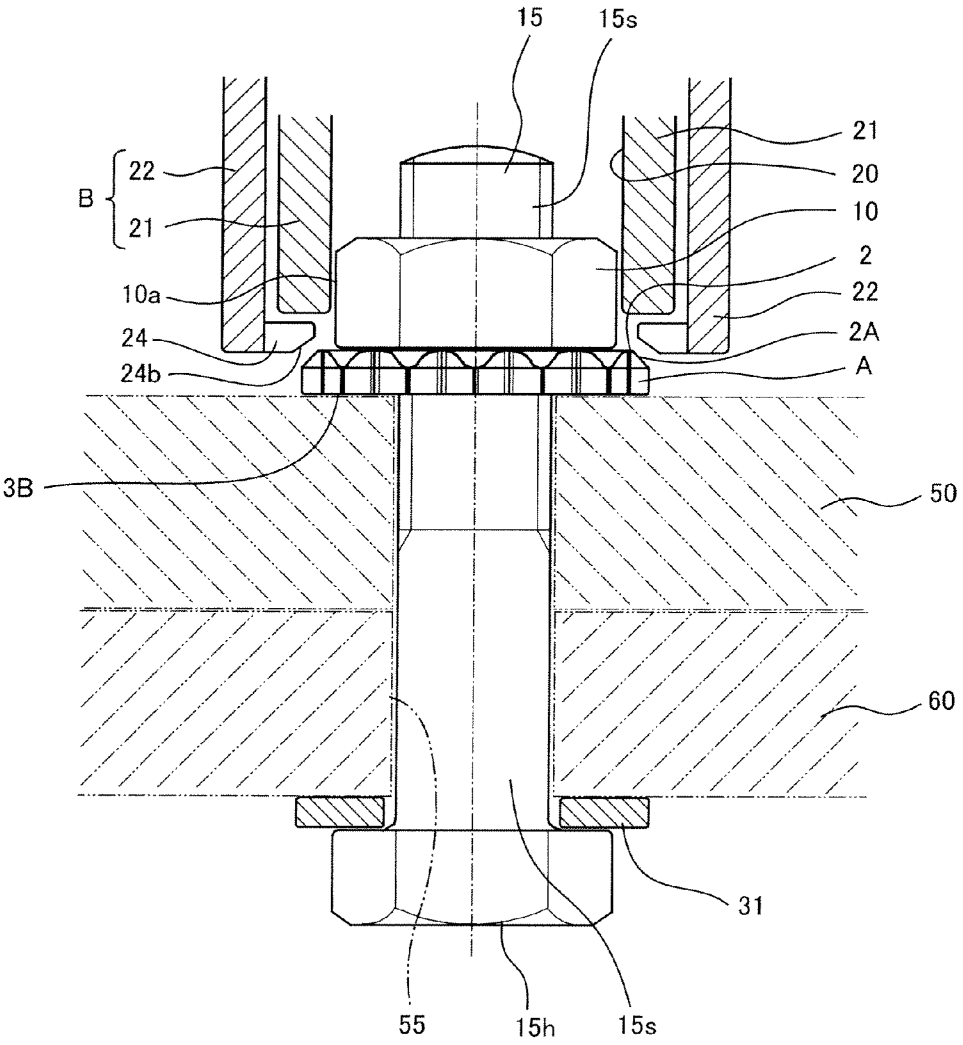
FIG. 8 is a partial cutaway side view showing a configuration of the washer of FIGS. 1-4 and a fastening socket according to the present invention.

On the other hand, a fastening socket B according to the present embodiment has a structure described below. FIG. 8 shows a partial structure (a bottom end portion). An outer socket portion 22 surrounds an inner socket portion 21, forming a coaxial double shaft construction (biaxial). The inner socket portion 21 is provided with a hexagonal hole 20, which is a kind of engaging means with which a nut 10 (or a bolt head 15*h*) is engaged (as used herein, the term "hexagonal hole" refers to a hole having an integer multiple of 6 vertices. In this embodiment, a dodecagonal hole is used). The outer socket portion 22 is provided with an engaging hole having a shape substantially identical to the outer shape of the washer A as seen in plan view. Furthermore, in an axial direction (upwardly or downwardly in FIG. 8), a tip end of the outer socket portion 22 extends from a tip end of the inner socket portion 21 by a distance substantially equal to a thickness of the washer A toward the tip end (downwardly in FIG. 8). The inner socket portion 21 and the outer socket portion 22 are coupled together at one end (not shown) with a mechanism that allows cooperative relative rotation thereof. In this embodiment, the inner socket portion 21 and the outer socket portion 22 are structured such that their rotational axes are co-axial.

In another embodiment, the "engaging means" may be a hexagonal bar (in this specification and the claims, the term "hexagonal bar" may refer to a bar having a shape in cross-section other than a hexagonal shape (for example, a hex lobe shape in cross-section) that is inserted into a hexagonal wrench hole (in this specification and the claims, the "hexagonal wrench hole" is a general term that refers to a wrench hole other than hexagonal (for example, hex lobe wrench hole) formed in the bolt head.

The above "mechanism that allows cooperative relative rotation" can be embodied by, for example, a gear mechanism. For example, the above "mechanism" can be embodied by a "planetary gear mechanism", where a sun gear is formed in an outer periphery of an upper end portion (not shown) of the inner socket portion 21, an outer ring gear is formed in an outer periphery of an upper end portion (not shown) of the outer socket portion 22, these outer ring gear and sun gear are coupled by a plurality of planetary gears disposed therebetween such that the sun gear and the outer ring gear are rotated relatively in opposite directions. In this case, each rotary shaft of each planetary gear is rotatably fixed to a non-rotating portion of the socket B to prevent it from revolving (orbiting).

The above "mechanism that allows cooperative relative rotation" can be embodied by some other gear mechanism or a mechanism other than gear mechanisms. The phrase "relative rotation" may include the case where one of the outer socket portion 22 and the inner socket portion 21 rotates and the other one is fixed. For example, the outer socket portion 22 may be fixed and the inner socket portion 21 may rotate. This construction can be embodied by the fixed outer gear ring, the sun gear configured to rotate, and the planetary gears located therebetween and configured to rotate and revolve. This is a simple construction.

Furthermore, as shown in FIG. 8, the bottom end portion of the outer socket portion 22 provides with engaging claws 24. In this embodiment, the engaging claws 24 project from the inner peripheral face of the outer socket portion 24 to inward. The engaging claws 24 are shaped so as to engage the engaging teeth of the washer A. More specifically, in this embodiment, the engaging claws 24 are shaped such that the engaging claws 24 conform in shape to and engage the engaging teeth formed by the plurality of convex portions 4B and concave portions 4A as viewed from the tip end portion (the bottom side of the socket in FIG. 8). An inner portion of a tip end surface 24*b* of each engaging claw 24 is formed by a tapered face, which is gradually inclined inwardly and toward the base end side of the outer socket portion 22.

As shown in FIG. 8, the washer A and the fastening socket B constructed above may serve as follows when objects 50, 60 are fastened between a bolt 15 and a nut 10. As shown in FIG. 8, a shaft portion 15*s* of the bolt 15 is penetrated through each of the bolt through-holes 55 formed through the two objects 50, 60, and the washer A for receiving counter torque is mounted on a tip end portion of the bolt shaft 15*s* projecting from a surface of the object 50 such that a bottom surface 3 B of the washer A abuts a surface of the object 50. Thereafter, the nut 10 is threaded on the bolt 15, and an operator (worker) tightens the nut 10 for so called "temporary tightening". It should be noted that a flat washer 31 having a general form is also mounted on a portion of the bolt shaft 15*s* closer to the bolt head 15*h*. However, in another embodiment (not shown), the washer A may be mounted such that the bottom surface 3B of the washer A abuts a surface of the object 60. In another embodiment, a screw hole with which the bolt 15 threadedly engages may be formed in the object 50 instead of the nut 10 and through-hole 55 of the object 50.

In this embodiment, an underside surface of the bolt head 15*h* that is brought into contact with the surface of the object 50 is provided with frictional coefficient increasing treatment. The frictional coefficient increasing treatment in this embodiment may include forming concavities and convexities in an underside surface using shot peening or forming edges at an outer edge of the underside surface for engaging (locking) in a rotational direction.

Under the condition under which the bolt 15 and the nut 10 are temporary tightened, as shown in FIG. 8, the socket B attached to a rotary shaft of an electrical tool (an impact-type electrical wrench, not shown) is positioned such that a hexagonal hole 20 of the inner socket portion 21 is set on the nut 10, and the socket B is then rotated by turning the switch of the electrical tool "ON", with the socket B being pressed in a direction toward the objects 50, 60.

When the socket B rotates in this manner, i.e., generally, when the inner socket portion 21 of the socket B rotates relatively in a clockwise direction as viewed from the base end side (from above in FIG. 8), the outer socket portion 22 rotates in a counterclockwise direction. As described above, when the outer socket portion 22 rotates, the engaging claws 24 rotate, while abutting the outer edge portion 2 of the washer A. Here, the tip end surfaces 24*b* of the engaging claws 24 are formed by tapered surfaces, as previously described, and a surface of the outer edge portion 2 of the washer A is formed by a tapered surface 2A, as previously described. Furthermore, as shown in FIG. 10(*b*), a tapered surface 2A of the convex portion 4B is formed such that a thickness of the tapered surface gradually increases toward the rear portion 4*r* in a tightening rotational direction. For this reason, the engaging claws 24 fall into the concave portions 4A disposed adjacent to and rearward, in the tightening rotational direction, of the convex portions 4B of the outer edge portion 2.

As a result, the outer socket portion 22 engages the washer A in a desired manner. In other words, the engaging claws 24 of the socket B engage the engaging teeth of the washer A.

If the rotation is further continued under this condition, since the construction above does not allow the washer A to rotate, the nut 10 can be tightened onto the bolt 15 while the washer A receives counter torque. Additionally, although the rotational torque acts on the nut 10, the construction above does not allow the bolt 15 to "simultaneously rotate with the nut 10". If, as described in Japanese Laid-Open Patent Application Publication No. SHO 18852, the electrical tool which is capable of controlling rotational torque by means of a controller is used, the nut 10 (or the bolt head 15) can be tightened at a desired rotational torque.

Thus, the fastening socket B and the washer A for receiving counter torque according to the present embodiments enables an operator to set the socket B on the nut 10 (or the bolt head 15*h*) and the washer A to a desired condition, by only setting the inner socket portion 21 on the nut 10 (or bolt head 15*h*).

Furthermore, according to the washer A of the present embodiment, a side surface 7 is formed by an inclined surface (an inclination angle of $\alpha$), as previously described. Therefore, when the engagement between the nut 10 (or the bolt head 15*h*) and the washer A to a desired condition is completed, impressions C (see FIGS. 1, 2, 9, 10), due to the abutting of the engaging claws, are clearly formed in rear ends in a tightening rotational direction of the washer A. As a result, based on the presence or absence of the impressions C, an operator can easily determine whether or not the nut 10 (or the bolt head 15*h*) is tightened at a desired rotational torque. In a preferred embodiment, the washer A is painted or subject to what is called "black-oxide-finish treatment" so that such impressions C can be clearly visualized.

Figure 5:
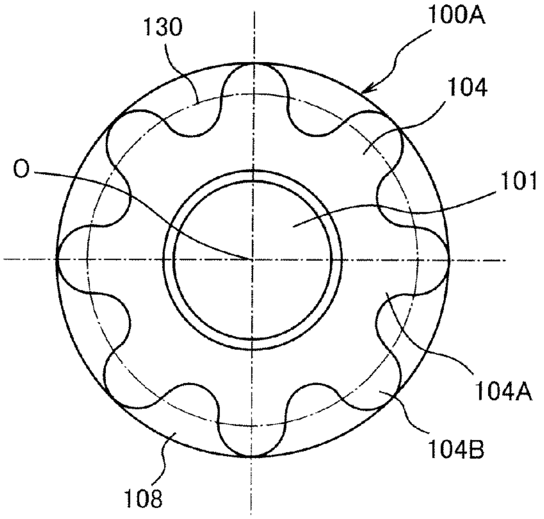
FIG. 5 is a plan view showing a configuration of a washer according to an embodiment different from the embodiment of FIGS. 1-4.
Figure 6:
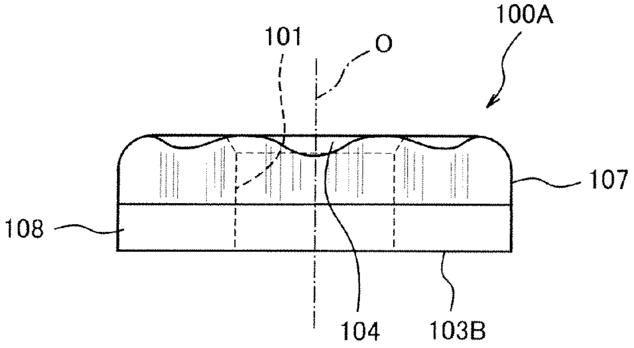
FIG. 6 is a side view showing the washer of FIG. 5.
Figure 7:
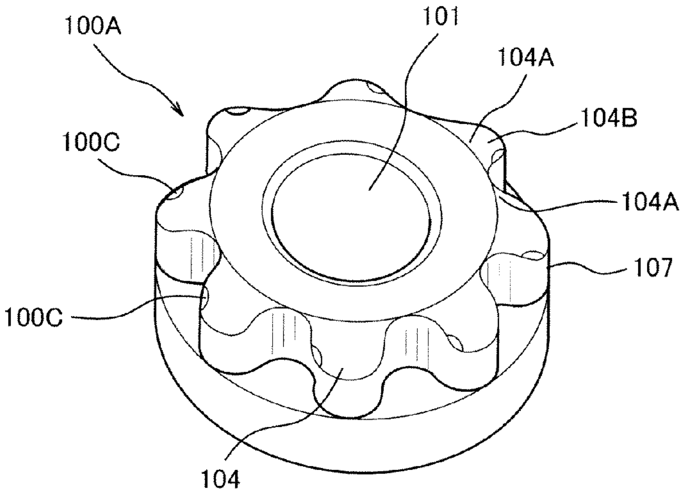
FIG. 7 is a perspective view showing a configuration of a top surface and a side surface of the washer of FIGS. 5 and 6, as viewed from obliquely above.

Furthermore, a washer 100A according to another embodiment may be integrally formed with a seat portion 108 located at a lower portion thereof, as shown in FIGS. 5-7. In this case, the other features of this embodiment may be the same as those of the previous embodiment. In this embodiment, the same components as those of the previously described embodiment are identified by the same reference numbers, and the corresponding components are identified by reference numbers to which "100" is added. This washer 100A is a preferred embodiment because a large contact area can be obtained. In other words, in this embodiment, the friction coefficient increasing treatment includes increasing a contact area.

In any of the above described embodiments, in place of or in addition to the feature of "projecting like a substantially edge-shape", the friction coefficient increasing treatment may include forming, in a bottom surface of a washer, projections such as projections generated by knurling or spike-like projections. Any of these constructions can increase frictional force (static frictional force and dynamic frictional force).

In the embodiments, the bolt 15 is temporarily tightened onto the nut 10. Even in such a case, the bolt 15 can simultaneously be rotated with the nut 10. More specifically, when the socket B is set on the nut 10 or the bolt head 15*h* and the socket B is then rotated for tightening, the bolt 15 or the nut 10 on the non-socket side may also be rotated in a same direction. In other words, simultaneous rotation occurs between the bolt 15 and the nut 10. As a result, the bolt 15 and the nut 10 cannot be tightened in a desired manner.

Therefore, it is desirable to adopt a fastener according to the present invention that provides a function of inhibiting simultaneous bolt-nut rotation.

Figure 11:
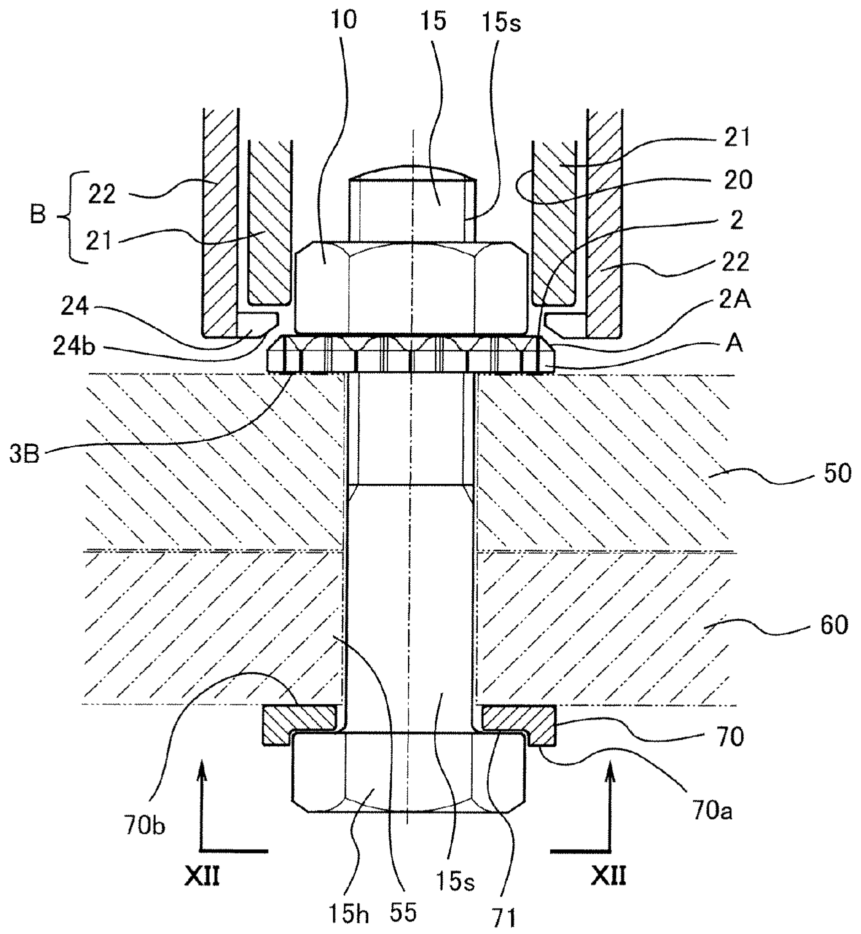
FIG. 11 is a partial cutaway side view showing a configuration of a washer, a fastening socket, and a fastener with an anti-rotation function according to the present invention.
Figure 12:
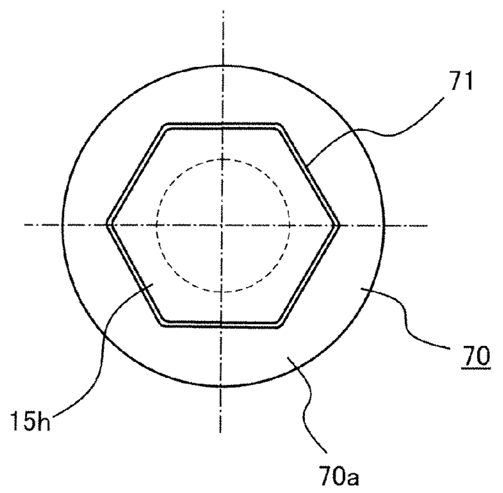
FIG. 12 is a view showing a configuration of an anti-rotation washer of the fastener and a bolt head engaging the anti-rotation washer, taken along the line XII-XII of FIG. 11.

In an embodiment of this fastener, in place of the flat washer 31 shown in FIG. 8, an anti-rotation washer 70 shown in FIG. 11 or 12 is used that includes one surface 70*a* and the opposite surface 70*b*. The one surface 70*a* is provided with a hexagonal recess 71 including an outer shape identical to that of a bolt head 15*h* (or nut 10) and a dimension slightly larger than that of the bolt head 15*h*. The opposite surface 70*b* is provided with frictional coefficient increasing treatment. This frictional coefficient increasing treatment is embodied by forming concavities and convexities on the opposite surface 70*b*. In any of the above described embodiments, in place of or in addition to the feature of "projecting like a substantially edge-shape", the friction coefficient increasing treatment may be embodied by forming, in a bottom surface of a washer, projections such as projections generated by knurling or spike-like projections. Of course, instead of this, frictional coefficient increasing treatment, such as forming projections like projections (convex and concave) generated by knurling or spike-like projections, may be performed. Alternatively, instead of the "frictional coefficient increasing treatment", at least one of the threaded portion of the nut and the threaded portion of the bolt may be provided with frictional coefficient reducing treatment. The frictional coefficient reducing treatment may be embodied by coating a wax or a resin on the threaded portion.

As a result, during tightening, the frictional force generated between the opposite surface 70*b* and the surface of the object 60 is greater than that generated at the threading portion between the nut 10 and the bolt 15. More specifically, it is great enough to inhibit simultaneous bolt-nut rotation. And, the anti-rotation washer 70 and the bolt head 15*a* (or the anti-rotation washer 70 and the nut 10) are locked against each other through hexagonal recess engagement. As a result, the nut 10 and the bolt 15 can be tightened without simultaneous rotation. In FIG. 11, the same components as those of the previously described embodiment shown in FIG. 8 are identified by the same reference numbers. The same components as those previously described need not be further described.

Figure 13:
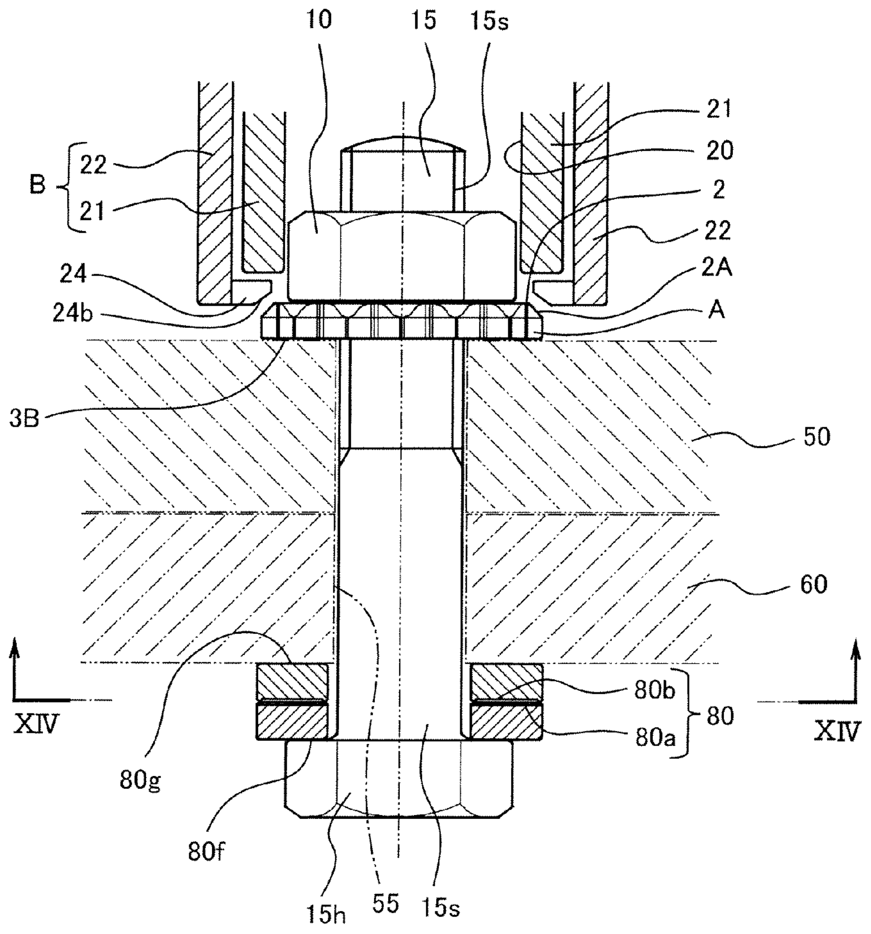
FIG. 13 is a partial cutaway side view showing a configuration of a fastener, where an anti-rotation washer is different from that of FIG. 11.
Figure 14:
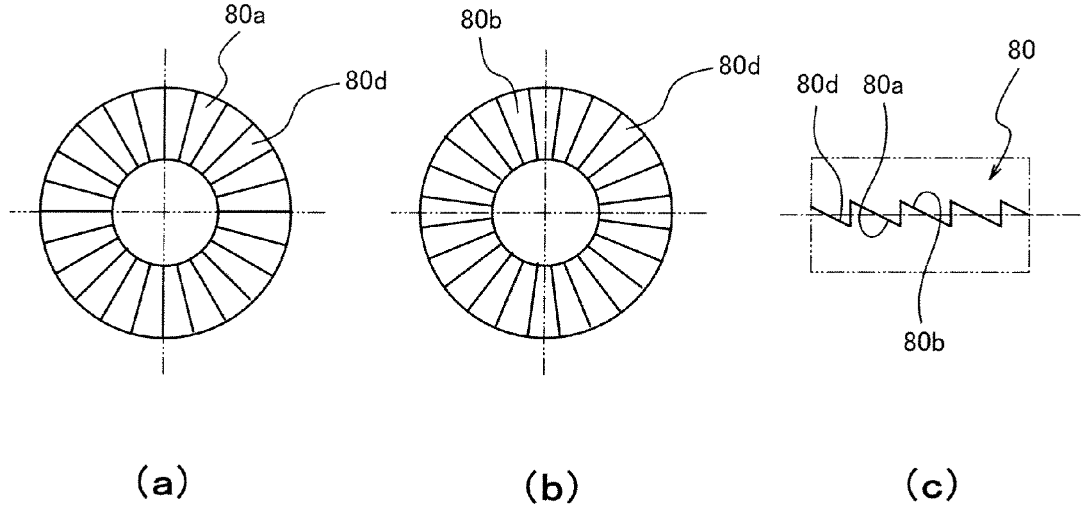
FIG. 14 is a view showing a configuration of the anti-rotation washer illustrated in FIG. 13, where (a) is a view, taken along the line XIV-XIV of FIG. 13, (b) is a view showing a joining surface to be engaged with the surface illustrated in (a), and (c) is a partial enlarged view of FIG. 13 showing an engaging condition of the engaging portion illustrated in (a)

Furthermore, in place of the anti-rotation washer 70, a fastener, shown in FIG. 13, may be provided with a pair of anti-rotation washers 80, which are disposed along the thickness thereof, and which include contact surfaces 80*a* and 80*b* where grooves 80*d* are formed, and the grooves 80*d* extend radially outwardly from a center of each surface as shown in FIGS. 14(*a*) and 14(*b*). As seen from the side view of FIG. 14(*c*), the grooves 80*d* are structured such that simultaneous bolt-nut rotation is effectively inhibited. The grooves 80*d* form locking surfaces that inhibit simultaneous bolt-nut rotation. In other words, in this embodiment, the frictional coefficient increasing treatment is embodied through the formation of the grooves 80*d*. In particular, as shown in FIG. 14(*c*), in a simultaneous bolt-nut rotation direction (in FIG. 14(*c*), a direction in which an upper member moves to the left), engagement is made in a direction substantially perpendicular to a rotational direction, and in a direction opposite to the simultaneous bolt-nut rotation direction, engagement is made at 45 degrees with respect to the rotational direction. These angles are provided merely as an example. Any angle may be used that can provide a higher locking force in a simultaneous bolt-nut rotation direction. Furthermore, a surface 80*f* and the opposite surface 80*g* of the anti-rotation washer 80 are provided with frictional coefficient increasing treatment such as shot peening, etc. In FIG. 13, the same components as those of the previously described embodiment shown in FIG. 8 are identified by the same reference numbers. The same components as those previously described need not be further described.

Figure 15:
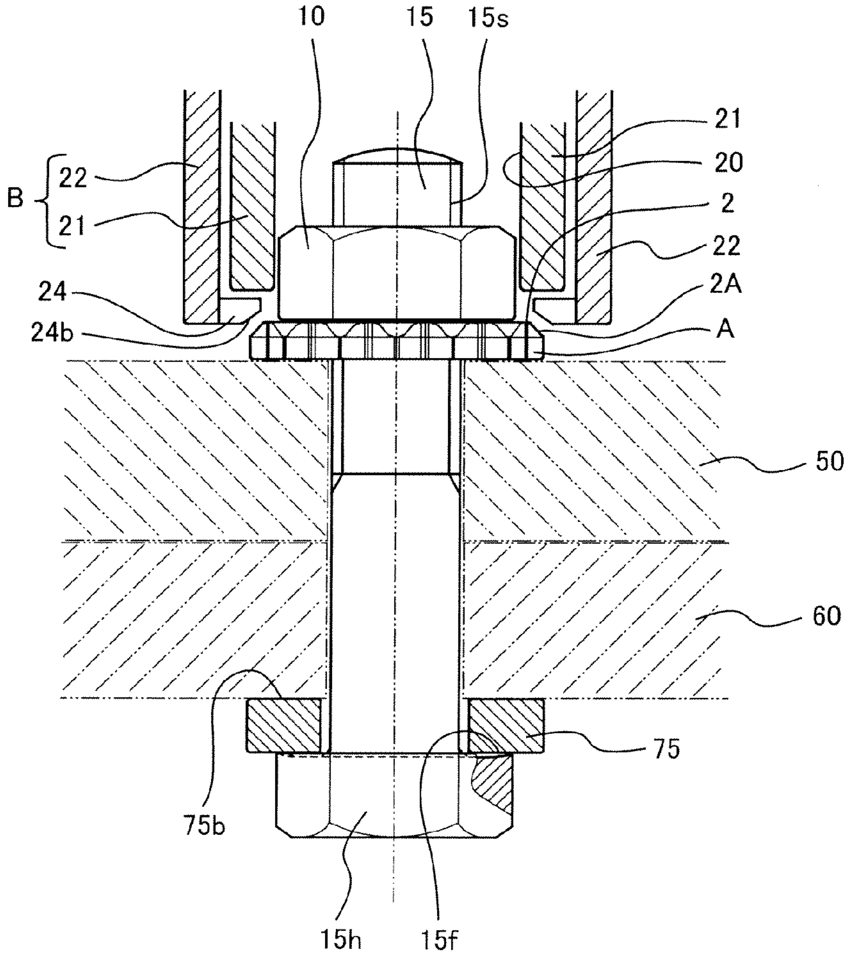
FIG. 15 is a partial cutaway side view showing a configuration of a fastener according to an embodiment different from those of FIGS. 11, 13.
Figure 16:
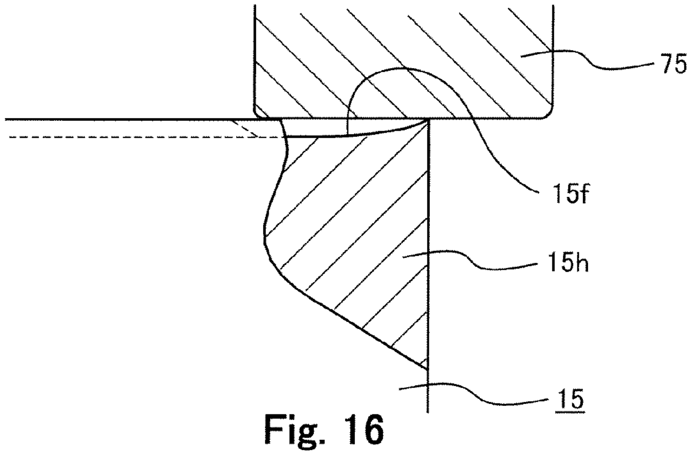
FIG. 16 is a partial cutaway enlarged view showing a configuration of an engaging portion between the bolt head and the anti-rotation washer illustrated in FIG. 15.

In a fastener according to another embodiment, as shown in FIG. 15 or in a partial enlarged view of FIG. 16, an underside surface 15*f* of a bolt head 15*h* that is brought into contact with an anti-rotation washer 75, which is on a side of the fastener where the socket B is not to be mounted (i.e., on a non-rotation side), is arched such that a central portion of the arched surface is spaced apart from a surface of the anti-rotation washer 75 and such that the arched surface is gradually inclined outwardly and toward the surface of the anti-rotation washer 75. And, a contact surface 75*b* of the anti-rotation washer 75 that is brought into contact with a surface of an object 60 may be provided with the previously described frictional coefficient increasing treatment. Of course, in an modified embodiment, where the socket B (not shown) is set on the bolt head 15*h*, a surface of a nut 10 that is brought into contact with an anti-rotation washer 75*a* may be arched such that a central portion of the arched surface is spaced apart from a surface of the anti-rotation washer 75 and such that the arched surface is gradually inclined outwardly and toward the surface of the anti-rotation washer 75, and a contact surface 75*b* of the anti-rotation washer 75 that is brought into contact with a surface of an object 60 may be provided with any of the previously described frictional coefficient increasing treatments.

Figure 17:
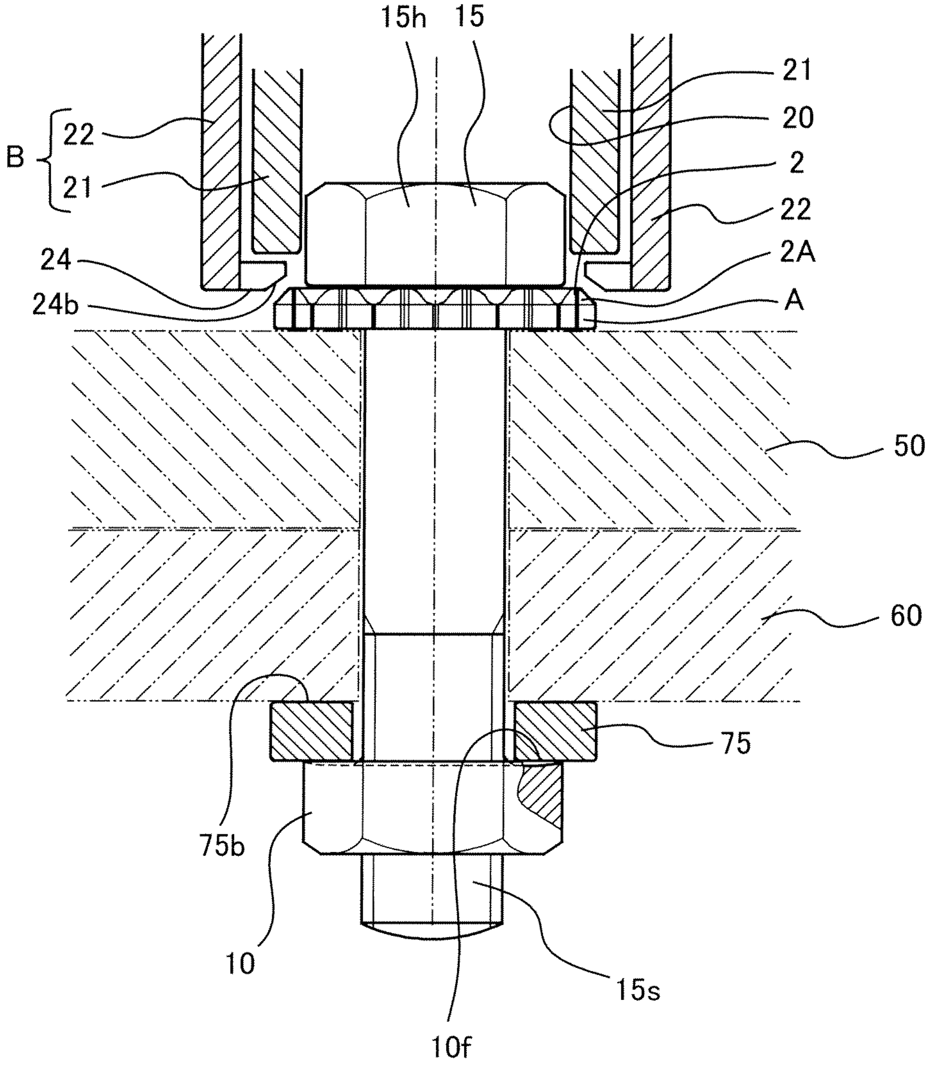
FIG. 17 is a view showing a configuration of an embodiment different from that of FIG. 15 only in that the position of the nut and the bolt head is reversed.

In the embodiment illustrated in FIG. 15 or FIG. 17, the contact surface 75*b* of the anti-rotation washer 75 that is brought into contact with the surface of the object 60, although not shown, may be arched such that a central portion of the arched surface is spaced apart from a surface of the anti-rotation washer 75 and such that the arched surface is gradually inclined outwardly and toward the surface of the anti-rotation washer 75, and may be provided with any of the previously described frictional coefficient increasing treatments. In FIG. 15, 17, the same components as those of the previously described embodiment shown in FIG. 8 are identified by the same reference numbers. The same components as those previously described need not be further described.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meters and bounds of the claims, or equivalents of such metes and bounds thereof are therefore intended to be embraced by the claims.

What is claimed is:

1. A fastening socket, comprising:
- an inner socket portion including engaging means for engaging a nut or a bolt head; and
- an outer socket portion for engaging a washer with an outer edge portion which includes a tapered surface and engaging teeth, the tapered surface being gradually inclined outwardly and toward a bottom surface of the outer edge portion,
- wherein the inner socket portion is disposed inside the outer socket portion,
- the inner socket portion and the outer socket portion are coupled together with a mechanism that allows the inner socket portion and the outer socket portion to be cooperatively and relatively rotated in opposite directions, and
- wherein the outer socket portion is provided with engaging claws for engaging the engaging teeth of the washer, and each of the engaging claws is provided with a tapered tip end surface, which is gradually inclined radially inwardly and toward a base end side of the outer socket portion.

2. A washer for receiving counter torque generated due to rotation of a nut or a bolt head which is mounted on a bolt shaft of the bolt and adjacent the nut or the bolt head, comprising:
- a hole at a center as seen in plan view, through which a bolt shaft portion is passed; and
- an outer edge portion extending outwardly relative to outer edges of the nut and the bolt head, and providing engaging teeth around the washer,
- wherein the washer is used when the nut or bolt is tightened with a fastening socket, which includes an inner socket portion with engaging means for engaging the nut or the bolt head and an outer socket portion for engaging the engaging teeth of the washer, the inner socket portion and the outer socket portion are coupled together with a mechanism that allows the inner socket portion and the outer socket portion to be cooperatively and relatively rotated in opposite directions, and
- wherein the outer edge portion of the washer provides a tapered surface at a socket side that is gradually inclined outwardly and toward a bottom surface of the outer edge portion.

3. The washer according to claim 2, wherein the engaging teeth includes an outer periphery, which is shaped such that concave portions extending inwardly and convex portions extending outwardly are alternately and repeatedly provided in a radial direction around an imaginary reference circle that is centered at a central point of the washer as seen in plan view.

4. The washer according to claim 3, wherein each convex portion has a tapered surface, which is formed such that a rear portion of the convex portion in a tightening rotational direction has a thickness greater than a front portion of the convex portion in the tightening rotational direction.

5. The washer according to claim 2, wherein the bottom surface is formed to be an arched surface, and the arched surface is gradually projected in a direction away from the socket starting from a center to outward.

6. A fastener for fastening objects, comprising:
- a bolt with a bolt head and a bolt shaft; and
- a nut to be tightened onto the bolt,
- wherein when the objects are to be fastened using the bolt and the nut, the washer according to claim 2 is disposed between the objects and one of the bolt and the nut, the one being to be rotated, and the fastening socket according to claim 1 is used for tightening; and
- wherein an anti-rotation washer is disposed between the objects and one of the bolt and the nut, the one being not to be rotated, and the anti-rotation washer provides a surface that is brought into contact with at least a surface of the objects and is provided with frictional coefficient increasing treatment.

7. The fastener according to claim 6, wherein the frictional coefficient increasing treatment includes providing concavities and convexities on the surface of the anti-rotation washer to increase friction.

8. The fastener according to claim 6, wherein the frictional coefficient increasing treatment is embodied by arching the surface that is brought into contact with the surface of the objects such that the arched surface at a center thereof is spaced apart from the surface of the objects, and such that the arched surface is gradually inclined outwardly and toward the surface of the objects.

* * * * *